Figure 1:
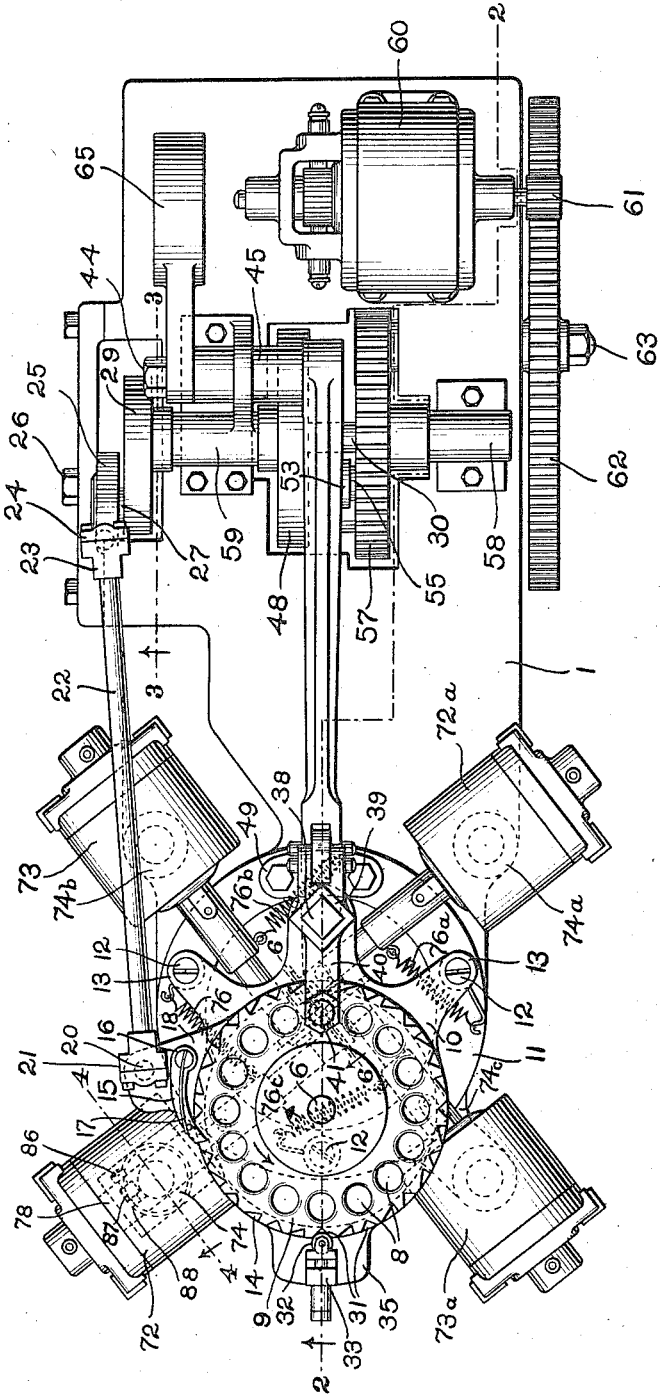

J. GRIMM.
MACHINE FOR SHELLING NUTS.
APPLICATION FILED MAY 14, 1914.

1,149,194.

Patented Aug. 10, 1915.
3 SHEETS—SHEET 1.

Witnesses:
A. H. Abell
Samuel Stimmel

Jacob Grimm Inventor
By his Attorney Lewis J. Doolittle

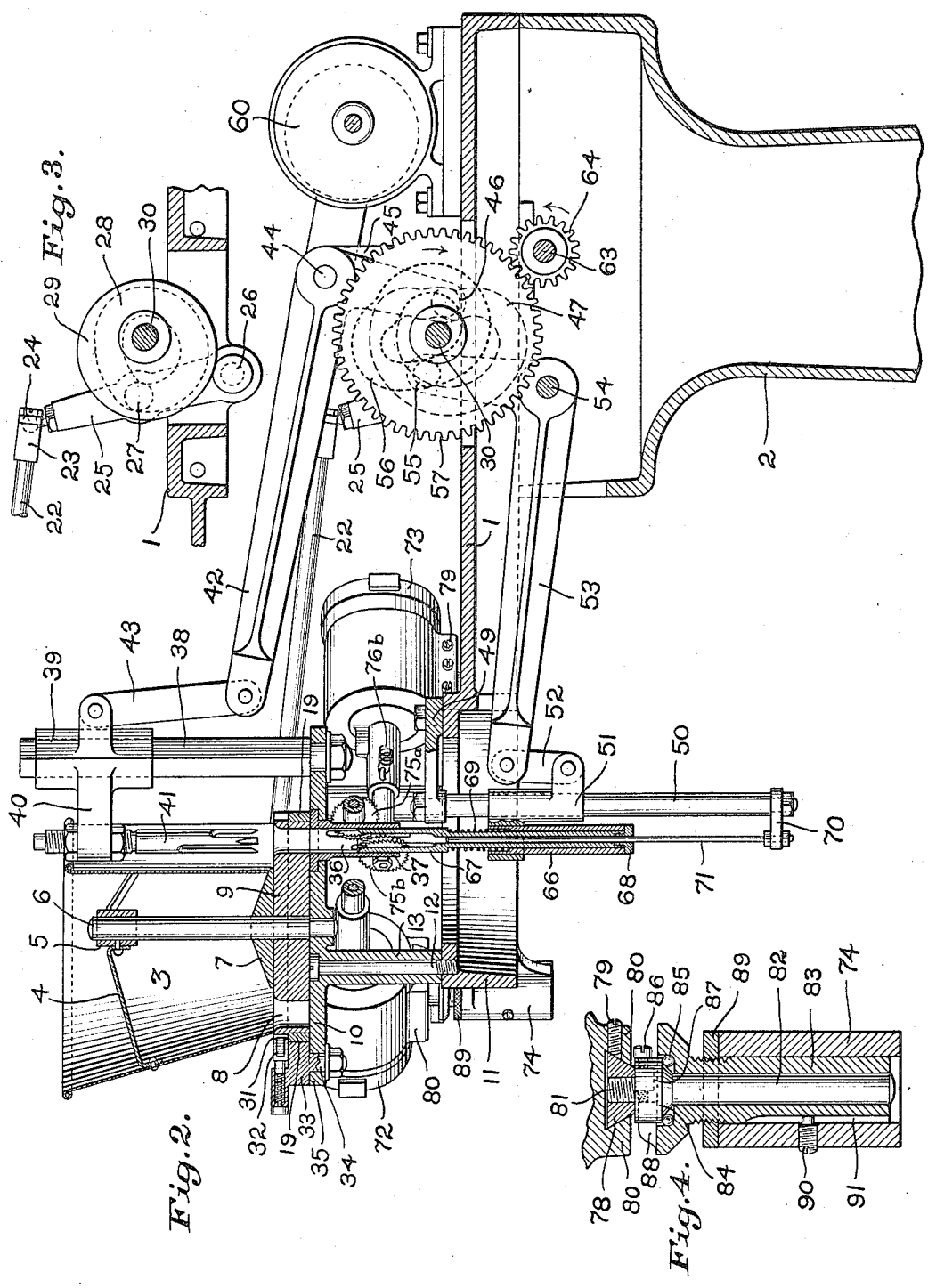

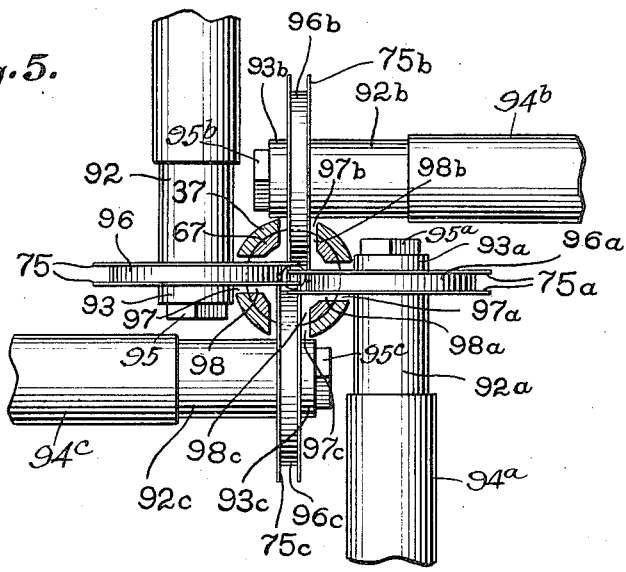
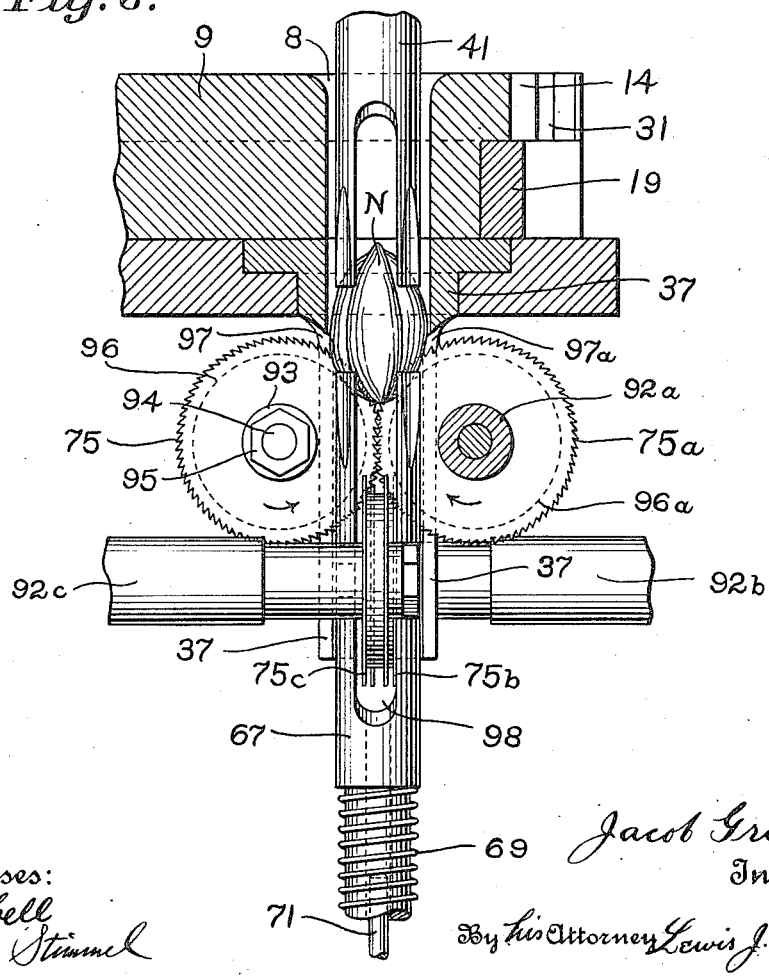

UNITED STATES PATENT OFFICE.

JACOB GRIMM, OF NEW YORK, N. Y., ASSIGNOR TO SAMUEL STIMMEL, OF NEW YORK, N. Y.

MACHINE FOR SHELLING NUTS.

1,149,194.      Specification of Letters Patent.      Patented Aug. 10, 1915.

Application filed May 14, 1914. Serial No. 838,502.

*To all whom it may concern:*

Be it known that I, JACOB GRIMM, a citizen of the United States, and resident of city, county, and State of New York, have invented certain new and useful Improvements in Machines for Shelling Nuts, of which the following is a specification.

This invention relates to the removal of shells from nuts so that the kernels or meat may be taken out intact. This is accomplished by sawing through the shells in such a manner that they will be cut into several sections and will fall off or may be readily removed by breaking through any thin films of shell which may be left after the sawing operation is performed.

The invention relates particularly to the arrangement and adjustment of the several saws. It also relates to the automatic mechanism for feeding the nuts from a hopper and conveying them past the saws and means for adjusting the saws for different sizes and varieties of nuts.

The object of the invention is to provide sure and positive means for feeding the nuts into the machine and into contact with the saws, and to divide the shells into several sections with a plurality of longitudinal cuts intersecting at the poles.

In the accompanying drawings which illustrate the invention, Figure 1 is a top plan view of the machine with the hopper removed. Fig. 2 is a longitudinal section on the line 2—2 of Fig. 1. Fig. 3 is a section on the line 3—3 of Fig. 1. Fig. 4 is a detail of the means for adjusting the saws, taken on line 4—4 of Fig. 1. Fig. 5 is a top view of the set of saws with the guides and the nut feeding fingers shown in section. Fig. 6 is a side view of the parts shown in Fig. 5 showing their relation to certain other parts of the machine, which are in section as indicated by line 6—6 of Fig. 1.

Referring to drawings, 1 is the bed-plate of the machine which is supported by the hollow standard 2, shown broken away, the foot or flange which rests on the floor not being shown.

3 is the hopper for receiving the nuts. It is retained in position by the spider 4 attached to a sleeve 5 on the stud 6. The latter also holds in position a conical plate 7 which causes the nuts to roll toward the outside of the hopper and drop into the series of holes 8 in the platen 9 which is free to revolve on the stud 6. The stud 6 is fixed in the center of the plate 10, which is secured to the circular frame 11 at the end of the bed-plate 1 by means of three threaded bolts 12 passing through sleeves 13 which are cast integral with the frame plate 10. The platen 9 is provided with ratchet teeth 14, which engage with a pawl 15, pivoted on the stud 16, the upper edge of which is slotted and carries a spring 17 for causing the pawl to engage with the ratchet teeth. The stud 16 is carried by a web 18, cast integral with the ring 19, which is free to oscillate on the circular lower portion of the platen 9. There is also secured to the web 18, a stud 20 which constitutes one member of a ball and socket joint 21 attached to one end of the connecting rod 22. To the other end is attached another ball and socket joint 23 having the stud 24 adjustably secured to the upper end of the feed-lever 25, which is pivoted on the stud 26. The cam roller 27 on the feed lever engages with the cam groove 28 in the cam 29, which is secured to one end on the main shaft 30. It will be seen that the rotation of the cam 29 causes the oscillation of the pawl 17 and the consequent turning of the platen 9 in the direction indicated by the arrow. Each oscillation turns the platen 9 a distance equal to the radial spacing of the ratchet teeth which correspond in number to the holes 8 for receiving the nuts. To insure the accurate movement of the platen 9 and to hold it stationary when the pawl is not turning it, the platen 9 is provided with V-shaped notches 31 corresponding in number to the holes 8 and being centrally located on the same radial lines which pass through the centers of the holes.

A spring pressed roller 32 centrally located diametrically opposite the center of the thimble 37, is carried by the block 33, secured by the stud 34 to the web 35 formed on the frame plate 10. This construction causes the holes 8 to register consecutively with the hole 36 in the thimble 37 which is secured in the frame plate 10.

The square stud 38 secured to a bracket formed on the frame plate 10 carries a slide 39, having an arm 40 to which is adjustably secured the upper finger bar 41 which is concentric with the hole 36 in the thimble 37. The slide 39 reciprocates vertically, the motion being imparted by the crank 42 attached thereto by means of the link 43. The crank 42 is secured to the stud 44 which projects through a bearing in bracket 45. The crank 42 has at the lower end a roller 46 which engages with the groove 47 (indicated in dash lines) in the cam 48 secured to shaft 30. The counter-weight 65, secured to the stud 44, balances the weight of the crank 42 and the parts attached to it, thereby minimizing the pressure and consequent wear of the roller 46 and cam-groove 47. It also insures the smooth operation of the moving parts.

The bracket 49, bolted to the circular frame 11 of the bed-plate 1, supports a downwardly projecting stud 50, carrying a slide 51 which is connected by the link 52 to the end of the crank 53. The latter is pivoted on the stud 54 and to its upper end is attached the roller 55 which engages with the cam-groove 56 (indicated by dotted lines) in the spur-gear 57 secured to the shaft 30. The action of the cam causes the vertical reciprocation of the slide 51 and the parts attached to it. The slide 51 carries a sleeve 66 which forms a guide for the lower finger-bar 67. The latter is provided with a nut 68 which limits its upward movement in the sleeve 66 due to the spring 69 which is under compression between the shoulder of the finger-bar and a counter sunk recess at the upper end of sleeve 66. Bracket 70 secured to the lower end of stud 50 supports a fixed rod 71, which projects upward through the center of the lower finger-bar 67.

As above stated, the cams 29 and 48, and the spur-gear 57 provided with the cam-groove 56, are all secured to the shaft 30 which is provided with a bearing 58 and a bearing 59 integral with bracket 45.

The mechanism above described is driven by an electric motor 60, provided with a pinion 61 meshing with spur-gear 62 secured to shaft 63, to which is also secured pinion 64, meshing with the spur-gear 57. Four electric motors, 72 72$^a$ 73 and 73$^a$, are pivotally supported by the brackets 74, 74$^a$, 74$^b$ and 74$^c$, cast on the bed-plate 1. Attached to the shaft of each motor is a pair of circular saws 75, 75$^a$, 75$^b$ and 75$^c$, respectively, which project through slots of different lengths in the thimble 37 and the finger-bars 41 and 67. The four sets of saws are drawn toward the center of the thimble 37 and finger-bars 41 and 67 are concentric with it, by means of the tension springs 76, 76$^a$, 76$^b$ and 76$^c$, the fixed ends of which are attached to several points on the frame.

Each of the four motors is provided with means for vertical, radial and center-distance adjustment by the means indicated in the enlarged detail Fig. 4. The center distance adjustment is accomplished by sliding the motors on the dove-tail 78 and securing them by means of the three set screws 79 in the gibs 80 formed on the lowerside of the motor casing. The dove-tail 78 is secured to the screw stud 81 formed on the upper end of the bearing-stud 82 carried by bearing-sleeve 83. An enlarged bearing-head 84 is formed on the bearing-stud 82 and it rests on ball-bearings 85 carried by the bearing-cup formed in the upper end of the bearing-sleeve 83. A ball-bearing is provided because the stud 82 must be free to oscillate freely and rapidly to a minute degree as the saws follow the irregularities of the nut shells through which they are sawing.

The radial adjustment is accomplished by means of the set screw 86 carried by an ear 87 formed on the lower side of the dove-tail 78. The end of the set screw 86 bears against a stop 88 formed on the upper end of the bearing-sleeve 83. These parts are indicated in dotted lines in Fig. 1 in the center of the motor 72. It will be seen that the saws 75, 75$^a$, 75$^b$ and 75$^c$ on the end of the motor shafts may be adjusted toward or away from the center of the thimble 37 by means of the radial adjustment described.

The vertical adjustment of each motor, and consequently of the saws attached to its shaft, is accomplished by means of the knurled nut 89 which is attached to the bearing sleeve 83 by means of a screw thread. As the nut 89 rests on the top of the bracket 74, the vertical adjustment of the sleeve 83 may be accomplished by turning the nut 89. After the proper adjustment is effected, the position of the bearing-sleeve 83 is fixed by means of the set screw 90, the end of which projects into a slot 91 in the bearing-sleeve 83 and serves to prevent the rotation of the latter.

Fig. 5 and Fig. 6 show the saws and the nut-feeding mechanism on an enlarged scale and particular reference is made to the relative relations of the saws.

As above stated, each motor drives a pair of saws which are clamped between the sleeves 92, 92$^a$, 92$^b$ and 92$^c$ and the washers 93, 93$^a$, 93$^b$ and 93$^c$ secured to the ends of the motor shafts 94, 94$^a$, 94$^b$ and 94$^c$ by the nut 95, 95$^a$, 95$^b$ and 95$^c$. The distance between the pair of saws is fixed by the disks 96, 96$^a$, 96$^b$ and 96$^c$, which also serve the important function of determining the depth of the cuts made by the saws in the nut shells. The latter may be varied by changing the diameter of the disk 96, etc., and the distance between the parallel saw cuts may be varied by changing the thickness of the disks. Both of these adjustments are necessary to adapt the saws to the characteristics of different forms of nuts, which vary greatly in the thickness and irregularity of the shells.

Fig. 5 shows the four pairs of saws projecting through slots 97, 97$^a$, 97$^b$ and 97$^c$ in the thimble 37 and also through slots 98, 98ª, 98ᵇ and 98ᶜ, in the lower finger-bar 67. The two sets of slots 97, etc., and 98, etc., register and there are four slots in each of the members disposed approximately radially to correspond to the disposition of the four pairs of saws about the center of the thimble 37 and the concentric finger-bars 41 and 67.

The edges of the two parallel sets of saws pass by each other or over-lap, one of each of the pair of saws projecting into the space between the pair of saws parallel to it on the opposite side of the center of the guiding and feeding mechanism for the nuts. Because of this overlapping arrangement of saws, the saw-cuts in the nut shell intersect at the vertical center line of the nut, first at the bottom and then at the top as the nut is fed downward by the finger-bars 41 and 67 against the saws. This is indicated in Fig. 6, which shows a nut —N— at the point where the saws 75 and 75ª have first reached the full depth of the cut, which is limited by the difference in the diameters of the disks 96 and 96ª and the saws 75 and 75ª.

An important feature of this invention is the relative location of the four pairs of saws. The two upper pairs 75 and 75ª, driven by the motors 72, 72ª, are located on a higher plane than the two pairs of saws 75ᵇ and 75ᶜ, disposed at approximately right angles to the first pair of saws. The arrangement of the two sets of saws in different planes make it possible for each of the two pairs to over-lap at their adjacent edges, as above described. It is necessary for the saws to over-lap in order to make the four pairs of saw cuts over lap on the vertical center line of the nut, thereby completely dividing the nut shell into four approximately equal sections.

After the nut is carried by the downwardly moving finger-bars 41 and 67 past the lower pair of saws 75ᵇ and 75ᶜ, the downward movement of the upper finger-bar 41 ceases and the lower finger-bar 67 continues to move downward until the upper ends of the fingers are slightly below the upper end of the fixed rod 71. The bottom of the nut strikes the rod 71 which lifts it off of the four supporting fingers of the lower finger-bar 67 and the nut drops off into a receptacle (not shown) placed under the center of the fixed rod 71, the shell cutting operation being completed.

The nut shells are sometimes held together around the kernels after the shells are sawed in quarters as described because of the thin septum which extends between the two sections of the kernel of some forms of nuts and connects the opposite sides of the shell. The final operation is to separate the four sections of the shell from the nut by hand, the kernel coming out in one piece.

The use of a fixed rod concentric with the nut feeding mechanism (the function of the fixed rod being to disengage the nut from the feeding mechanism) is a novel feature of this invention.

I have described above the several motions imparted by the three cams 29, 47 and 56, to the several members of the machine which they operate: The cycle of operation is as follows: Beginning with the parts in the position indicated by Fig. 2, in that position a nut (not shown) would have dropped through the hole in the platen 9 into the hole in the thimble 37 and would be resting upon the two upper rapidly rotating pairs of saws 75 and 75ª. The lower finger-bar 67 would then move upward until the upper ends of its fingers had lifted the nut clear of the saws. The upper finger-bar 41 would then move downward until its four fingers pressed on the upper end of the nut and forced the lower finger-bar slightly downward in relation to the sleeve 66, thereby slightly increasing the compression of spring 69. The yielding spring support for the lower finger-bar 67 is necessary to compensate for the various sizes of nuts. Nuts of all sizes are grasped between the upper and lower finger-bars with a practically uniform pressure. If desired, adjusting means for the compression spring 69 may be provided.

After the nut is grasped between the upper and lower finger-bars 41 and 67 the cams which operate them cause both of them to be moved downward at the same rate until the lower end of the upper finger-bar 41 is about in line with the lower edges of the two pairs of saws 75ᵇ and 75ᶜ, and the top of the nut has entirely cleared the saws. The downward movement of the upper finger-bar 41 then ceases and the lower finger-bar 67 continues downward until its upper end is slightly below the upper end of the fixed rod 71, which strikes the bottom of the nut and causes it to drop into the receptacle provided for that purpose. Both of the finger-bars then move upward until they reach the position in which they are indicated in Fig. 2.

While the operations above described have been progressing, the rotation of the cam 29 has carried the upper end of the feed lever to its extreme right hand position and the connecting rod 22 has turned the ring 19 on its axis until the pawl 15 has dropped into the ratchet tooth 14 immediately to the right of the ratchet tooth 17 with which it is shown in engagements in Fig. 1. Just after the lower end of the upper finger-bar 41 in its upward travel has cleared the upper surface of the platen 9, the cam 29 returns the feed lever 25 to the left and the pawl 15 rotates the platen 9 in the direction indicated by the arrow in Fig. 1 until the hole 8, shown in Fig. 1 just below the center of the thimble 37, registers with the center of said thimble. The nut carried by the hole 8, above referred to, then drops into the thimble 37 and the cycle of operations is completed. While platen 9 is being turned by the ratchet 14 and pawl 15, the upper finger-bar 41 remains stationary because the roller 46 is in the portion of the cam-groove 47 which is concentric with the shaft 30, the relation of the latter parts being as indicated in Fig. 2.

The cycle of operation above described is repeated continuously and each cycle effects the sawing of the shell of a nut in the manner described.

As many changes could be made in the above construction and many apparently widely different embodiments of my invention designed without departing from the scope thereof, I intend that all matter contained in the above description or shown in the accompanying drawings shall be interpreted as illustrative merely of an operative embodiment of my invention and not in a limiting sense.

What I claim is:

1. A nut shelling machine comprising a base, a plate having nut openings fixed to said base, a platen rotatably supported on said base having nut openings, ratchet-teeth on said platen, a ring surrounding said platen, a pawl carried by said ring, means for oscillating said ring and causing said pawl to engage said ratchet-teeth, a thimble fixed to said plate having an opening therethrough adapted to register with the openings in said platen and plate, means for feeding nuts to the two last mentioned openings, means for supporting a nut in said thimble opening and means for subjecting the shells of the nuts to a plurality of cuts.

2. A nut shelling machine comprising a suitably supported plate having a nut receiving opening therein, upper and lower slotted finger bars in alinement with said opening, motors pivoted to said plate, the shafts of said motors being in different horizontal planes, saws attached to avoid shafts projecting through said slots, and separate means for adjusting said motors vertically, radially and as to center-distance.

3. A nut shelling machine comprising a suitably supported plate having a nut receiving opening therein, nut guiding and supporting means in alinement with said opening, pairs of saws adjacent said guiding and supporting means, means for driving said saws, and means for adjusting said driving means vertically and radially.

4. A nut shelling machine comprising a base, a platen rotatably mounted on said base having nut receiving openings, means for feeding nuts to said openings, upper and lower slotted finger bars, means for rotating said platen to bring said opening in alinement with said finger bars, a plurality of pairs of saws, the saws of each pair being in different horizontal planes, said saws projecting through the slots in said finger bars, means for adjusting the position of said saws vertically and as to center distance and motors for driving said saws.

5. A nut shelling machine comprising a suitably supported plate having a nut receiving opening therein, slotted nut guiding and supporting means in alinement with said opening, pairs of saws in different horizontal planes projecting through said slots, means for driving said saws and separate means for adjusting said saws vertically, radially and as to center distance.

6. A nut shelling machine comprising a suitably supported plate having a nut receiving opening therein, upper and lower finger bars in alinement with said opening, means for advancing the bars toward each other to grip the nut therebetween, means for advancing the bars and subjecting the nuts to a plurality of cuts, means for separating the finger bars, and a fixed bar within the lower finger bar coacting with the said bar on its last downward movement for displacing the cut nuts.

Signed at the city, county and State of New York, this 6 day of May, 1914.

JACOB GRIMM.

Witnesses:
SAUL W. LEVY,
SAMUEL STIMMEL.